(12) United States Patent
Revankar et al.

(10) Patent No.: US 8,124,039 B2
(45) Date of Patent: Feb. 28, 2012

(54) PROCESS OF SILICON TETRAFLUORIDE GAS SYNTHESIS

(76) Inventors: Vithal Revankar, Houston, TX (US); Sanjeev Lahoti, Houston, TX (US)

(*) Notice: Subject to any disclaimer, the term of this patent is extended or adjusted under 35 U.S.C. 154(b) by 198 days.

(21) Appl. No.: 12/359,515

(22) Filed: Jan. 26, 2009

(65) Prior Publication Data
US 2010/0189621 A1    Jul. 29, 2010

(51) Int. Cl.
*C01B 33/08*    (2006.01)
(52) U.S. Cl. ........ 423/341; 423/342; 423/544; 423/549; 423/554; 423/555; 423/556

(58) Field of Classification Search ............. 423/341, 423/544, 549, 554, 555, 556, 342
See application file for complete search history.

(56) References Cited

U.S. PATENT DOCUMENTS
3,218,124 A    11/1965    Oakley, Jr. et al.
(Continued)

*Primary Examiner* — Ngoc-Yen Nguyen
(74) *Attorney, Agent, or Firm* — Baker & McKenzie LLP

(57) ABSTRACT

A process of producing silicon tetrafluoride from fluoride containing feedstocks. The process calcines the fluoride containing feedstock and a silica containing feedstock before reacting the mixture with sulfuric acid to produce silicon tetrafluoride. The silicon tetrafluoride is scrubbed with sulfuric acid. Excess sulfuric acid is recycled to the process. The process demonstrates an economic and environmentally friendly way to produce high quality silicon tetrafluoride.

12 Claims, 5 Drawing Sheets

U.S. PATENT DOCUMENTS

| | | |
|---|---|---|
| 3,969,485 A | 7/1976 | Flemmert |
| 4,062,930 A | 12/1977 | Zawadzki et al. |
| 4,262,409 A | 4/1981 | Madej |
| 4,374,111 A | 2/1983 | Lefrancois |
| 4,442,082 A | 4/1984 | Sanjurjo |
| 4,458,087 A | 7/1984 | McAlister |
| 4,470,959 A | 9/1984 | Talwar et al. |
| 4,601,798 A | 7/1986 | Jacubert et al. |
| 4,615,172 A | 10/1986 | Mayer |
| 4,900,530 A | 2/1990 | Anania et al. |
| 6,217,840 B1 * | 4/2001 | Barnett et al. ............ 423/335 |
| 6,770,253 B2 | 8/2004 | Nakagawa et al. |
| 2009/0263307 A1 * | 10/2009 | Nanis et al. ............ 423/350 |

* cited by examiner

Bench Scale Experimental System

** All values are lbs/hr
** Single train of 1500 t/y

PROCESS OF SILICON TETRAFLUORIDE GAS SYNTHESIS

FIELD OF THE INVENTION

The present invention relates to a novel process for producing silicon tetrafluoride ($SiF_4$). In particular, the present invention relates to the process of producing silicon tetrafluoride from alkali fluorides, silica and sulfuric acid in a two step process.

BACKGROUND OF THE INVENTION

Silicon tetrafluoride is an important chemical intermediate, useful for the production of valuable products, such as pure silica, silanes, pure silicon for solar cells, silicon nitride for ceramic products and fluorinated carbon-silicon polymers for materials for architectural uses. Other uses of silicon tetrafluoride include: treating dried concrete parts in order to provide a considerable improvement of their waterproofness and resistance to corrosion and abrasion; increasing the hydrophobic character of crystalline molecular sieves for producing orthosilicic acid esters; and as an etching medium for materials containing silicon in the semiconductor industry.

Known methods for producing silicon tetrafluoride, along with hydrogen fluoride, include reacting sulfuric acid with fluorspar, forming calcium sulfate as by-product. The reaction is endothermic and heat must be externally provided. Methods have been devised to improve heat transfer characteristics, yield and purity. Fluorosilicic acid, from phosphoric acid production, may also be used as feedstock to produce hydrofluoric acid and silicon tetrafluoride. In general, a stream of concentrated sulfuric acid, or oleum, and a concentrated aqueous solution of fluorosilicic acid are fed to a stirred reactor, producing hydrofluoric acid and silicon tetrafluoride in the form of a gas stream, which is washed by concentrated sulfuric acid. Also known is a process in which a stream of aqueous fluorosilicic acid is fed to an intermediate point between the head and the bottom of a vertical tower, and a stream of concentrated sulfuric acid is fed near the head of the tower. From the head of the tower, an overhead gas stream containing silicon tetrafluoride is recovered, and from the bottom of the tower a stream of diluted sulfuric acid is recovered. Yields of 95.4% to 98.5% are achieved, with a content of hydrofluoric acid in the silicon tetrafluoride, being lower than 0.1% by volume.

Other processes for manufacturing silicon tetrafluoride are based on elemental silicon. Elemental silicon and hydrogen fluoride are reacted at temperatures of about 250° C. or higher. The reaction may be conducted such that the gas product contains at least 0.02 volume % of the unreacted hydrogen fluoride. The process may be improved by contacting the gas product with elemental nickel at a temperature of 600° C. or higher.

A characteristic common to all these processes is constituted by the low yields of conversion of raw materials into silicon tetrafluoride and undesirable by-products. The impurities, in particular, compounds of fluorine, boron, phosphorus and arsenic elements which remain in the silicon tetrafluoride.

A process for producing silicon tetrafluoride with high conversion and purity from sources of fluoride with limited environmental impact is needed.

BRIEF SUMMARY OF THE INVENTION

The present invention relates to a novel process for producing silicon tetraflouride ($SiF_4$). In particular, the present invention relates to the process of producing silicon tetraflouride from metal fluorides, silica and sulfuric acid. The process is novel and demonstrates an economic and environmentally friendly way to produce high quality silicon tetraflouride.

Embodiments of the invention provide a process of producing silicon tetraflouride from metal fluorides including the steps of (a) calcining and mixing the feedstock with silicon containing material to produce fluorosilicate complexes; (b) reacting the fluorosilicate complexes with sulfuric acid to produce silicon tetrafluoride and metal sulfates; and (c) scrubbing the silicon tetrafluoride to remove excess moisture, dust and other acid gases. In some embodiments, calcining the feedstock occurs at temperatures ranging from about 200° C. to about 600° C. In other embodiments, calcining the feedstock occurs at temperatures ranging from about 300° C. to about 400° C. In some embodiments, calcining the feedstock occurs at residence times ranging from about 3 to about 25 minutes. In some embodiments, the feedstock particles and silica range in size from about 200 microns to about 600 microns. In some embodiments, reacting the fluorosilicate complexes with sulfuric acid occurs at temperatures ranging from about 100° C. to about 500° C. In some embodiments, the amount of sulfuric acid is up to 20% stoichiometric excess. In some embodiments, the sulfuric acid has a concentration ranging from about 50 to about 100%. In other embodiments, the sulfuric acid has a concentration ranging from about 98 to about 100%. In some embodiments, there is a 99% conversion efficiency of the metal fluorides in the feedstock. In some embodiments, the excess sulfuric acid is recycled. In some embodiments, the metal fluoride is sodium aluminum fluoride which may be recycled from a silane manufacturing process. In some embodiments, internal recycling enhances the yield of silicon tetraflouride.

DETAILED DESCRIPTION OF THE INVENTION

The present invention is a novel process using sulfuric acid to produce silicon tetrafluoride from sources containing flouride. The process may also include recycling the sulfuric acid to the process.

Unless otherwise specified, all quantities, percentages and ratios herein are by weight.

Figure 1:
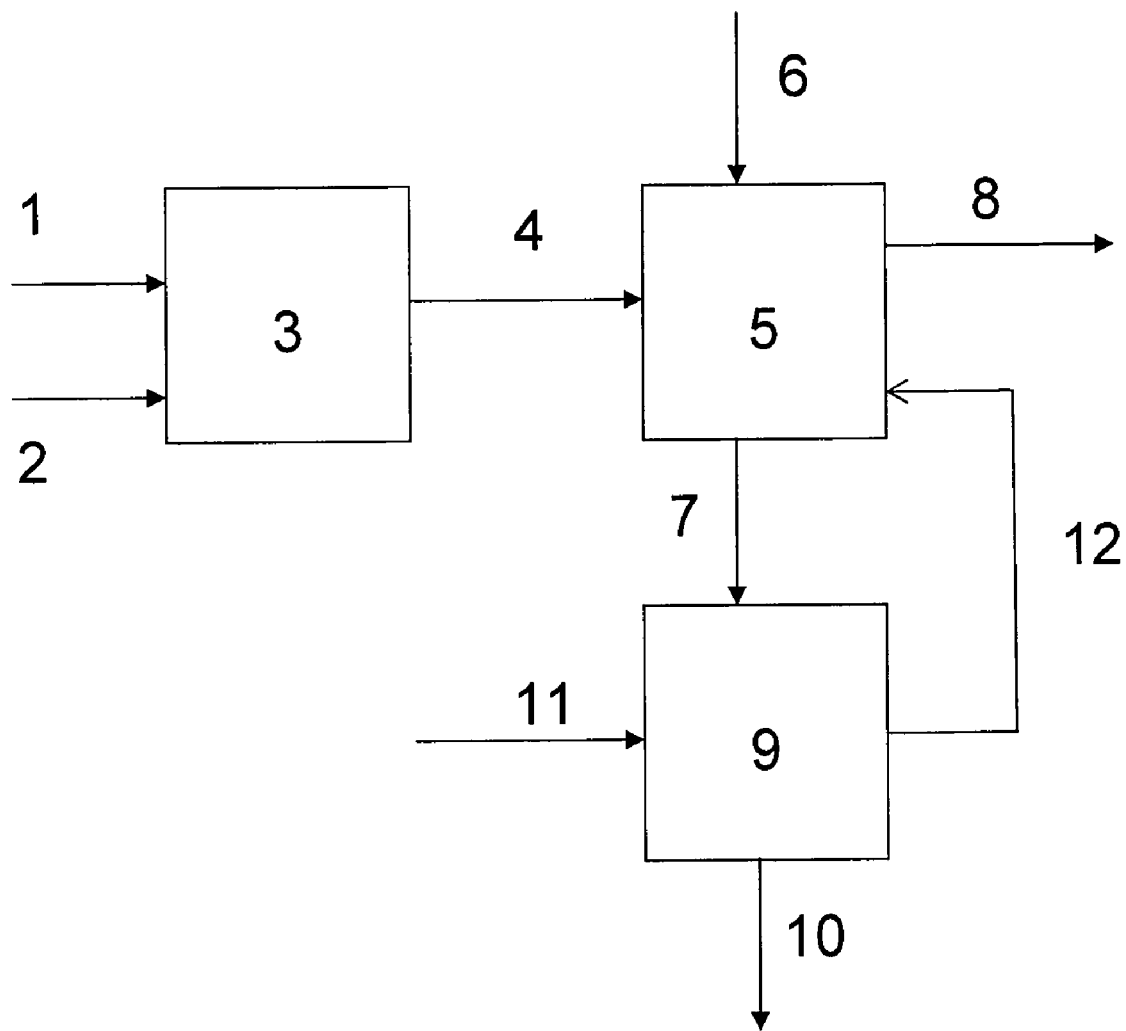
FIG. 1 is a schematic presentation for an embodiment of a silicon tetrafluoride producing process.

Referring to FIG. 1, an embodiment of the invention is shown which provides a fluoride source 1 and a silica source 2 to a first reactor 3 for calcination. In some embodiments, the first reactor 3 operates at temperatures ranging from about 200 to about 600° C., more preferably from about 300 to about 400° C. The calcination helps remove hydrocarbons and other low volatile components from the fluoride source 1 and the silica source 2 assisting in avoiding any crust/lump formation downstream. The fluoride source 1 may be any metal or alkali fluoride, preferably fluorspar (calcium fluoride), sodium fluoride or aluminum fluoride which are easily available as natural ore or as a by-products from other silicon based industrial processes. The silica source 2 may be any silicon containing material, preferably sand or quartz ore. The first reactor 3 may be any suitable mixing system which is capable of providing intimate contact between the fluoride source and silica source, such as but not limited to a screw type mixer. In some embodiments, the fluoride source 1 and the silica source 2 are introduced at separate points into the first reactor 3. In other embodiments, the fluoride source 1 and the silica source 2 are introduced at the same point into the first reactor 3. In some embodiments, there is more than one first reactor 3, such as a cascade of reactors. In some embodiments, the first reactor 3 has more than one combustion chamber or zone. In some embodiments, the number of zones in the first reactor 3 ranges from 1 to 15. In some embodiments, the first reactor 3 is a kiln or a furnace. In some embodiments, the first reactor 3 is any heating device capable of providing calcining conditions.

The first reactor 3 preferably kneads or otherwise mixes the fluoride source 1 and the silica source 2 intimately and also calcines the fluoride source 1 and the silica source 2 producing a solid product 4. Any combination of temperature, pressure and contact may be used to produce the solid product 4. The solid product 4 is called in-situ and is comprised of easily decomposable fluorosilicate complexes. The complexes may be formed in the presence of small amounts of moisture in the fluoride source 1 or the silica source 2. Typical reactions in the first reactor 3 include, for example:

$$CaF_2+SiO_2+H_2O \rightarrow Ca_zSi_w(F_xO_y)+Ca_zSi_w(F_{x'}(OH)_y) \quad (1)$$

$$NaF+AlF_3+SiO_2+H_2O \rightarrow Na_mAl_zSi_w(F_xO_y)+Na_zSi_w(F_{x'}(OH)_y)+Na_mAl_w(Si_xO_y)(F)_z \quad (2)$$

Fluorosilicate complexes in solid product 4 like those produced in equations (1) and (2) above, along with others having similar formulas like $Na_2Ca(Si_xO_y)(F)_z$, $Na_zSi_w(F_xO_y)$, $Al_zNa_mSi_w(F_xO_y)$, and various combinations have been identified.

The solid product 4 is discharged from the first reactor 3 to a second reactor 5. The solid product 4 has a uniformly mixed dry to earthy consistency that is not tacky, preventing the reaction mixture from adhering to, smearing on, or forming lumps in the second reactor 5.

Sulfuric acid 6 is also provided to the second reactor 5 to produce a product 7 and a by-product 8. In other embodiments, a strong acid may be used such as, but not limited to, nitric acid. Product 7 typically includes silicon tetrafluoride, dust and water vapor. By-product 8 typically includes metal sulfates. The location of the discharge of product 7 and by-product 8 from second reactor 5 may vary in different embodiments of the invention. Typical reactions that may occur in the second reactor 5 include, but are not limited to, are:

$$2CaF_2+SiO_2+2H_2SO_4 \rightarrow 2CaSO_4+SiF_4(gas)+2H_2O(vapor)$$

$$CaF_2+2NaF+SiO_2+2H_2SO_4 \rightarrow CaSO_4+Na_2SO_4+SiF_4(gas)+2H_2O(vapor)$$

$$CaF_2+2AlF_3+2SiO_2+4H_2SO_4 \rightarrow CaSO_4+Al_2(SO_4)_3+2SiF_4(gas)+2H_2O(vapor)$$

$$2NaAlF_4+2SiO_2+4H_2SO_4 \rightarrow Na2SO_4+Al_2(SO_4)_3+2SiF_4(gas)+2H_2O(vapor)$$

In general:

$$aMF_x+bSiO_2+cH2SO_4 \rightarrow dM_e(SO_4)_f+gSiF_4(gas)+hH_2O(vapor)$$

where M is any metal and a,b,c . . . are integers.

The second reactor 5 operates at temperatures ranging from about 100 to about 500° C., more preferably from about 200 to about 250° C. The sulfuric acid 6 may have a concentration ranging from about 50 to about 100%, preferably about 98 to about 100%. The temperature of the sulfuric acid 6 ranges from about 30 to about 150° C. In some embodiments, 1%, 5%, 10%, 15%, up to about 20% stoichiometric excess of sulfuric acid 6 is used. The reactions in the second reactor 5 are endothermic and therefore, generally require the addition of energy. In some embodiments, some of the energy required for the reactions in the second reactor 5 is provided by the heat of the solid product 4 or the sulfuric acid 6. In some embodiments, the latent heat of the the solid product 4 or the sulfuric acid 6 is maximized without compromising the operation of either the first reactor 3 or the second reactor 5. In other embodiments, some of the energy is provided by means of heating second reactor 5, preferably indirectly. In a preferred embodiment, the second reactor 5 is a rotary tube type. In some embodiments, the second reactor 5 has more than one combustion chamber or zone. In some embodiments, the number of zones in the second reactor 5 ranges from 3 to 15. In some embodiments, the second reactor 5 is a kiln or a furnace. In some embodiments, the second reactor 5 is any heating device capable of providing calcining conditions. In some embodiments, the second reactor 5 is referred to as the silicon tetrafluoride production reactor.

The product 7 is sent to a scrubber 9 where it is scrubbed with sulfuric acid 11 to remove water, dust, low volatiles and excess acid. In other embodiments, a strong acid may be used such as, but not limited to, nitric acid. Silicon tetrafluoride 10 and a recycle 12 of sulfuric acid exit the scrubber 9. The recycle 12 of sulfuric acid may be reintroduced into the scrubber 9 or recycled back to the second reactor 5 to minimize sulfuric acid waste. The silicon tetrafluoride 10 may be used or sent for further processing. In some embodiments the scrubber 9 is also referred to as a silicon tetrafluoride (STF) dryer.

In an alternate embodiment, the product 7 is sent to a drying tower filled with drying agent to remove water, dust, low volatiles and excess acid. The drying agent may be any drying agent which is capable of removing water, dust, low volatiles and excess acid.

The particle size of the fluoride source 1 and the silica source 2 may improve the conversion and yield of silicon tetrafluoride from the second reactor 5. In some embodiments, the average particle size of the fluoride source 1 and the silica source 2 is about 200 microns with very few particles being no larger than about 600 microns. While not being bound by any theory, the fluoride source 1 and the silica source 2 of such size produce fluorosilicate complexes before releasing silicon tetrafluoride gas. In some embodiments, poor control of particle size establishes poor intimate contact between the raw materials, leading to poor product yield. Without production of such fluorosilicate complexes, a two stage reaction is necessary to produce silicon tetrafluoride, i.e., formation of hydrogen fluoride with subsequent reaction with silica. Larger particle sizes produce large amounts of hydrogen fluoride gas along with unconverted raw material (particularly silica) in the discharge by-product (sulfates), thereby reducing the overall yield of silicon tetrafluoride.

The formation of fluorosilicate complexes may take place in either the first reactor 3 or the second reactor 5. The degree of fluorosilicate complex formation is influenced by the temperatures and residence time in the first reactor 3. The average residence time in the first reactor is about 2 to about 30 minutes, more preferably between about 10 and 20 minutes. In some embodiments, residence times in this range achieve greater than 99% silicon tetrafluoride gas yield. Longer residence times are possible, although they may impact the economics of the process.

Higher conversion of fluoride to silicon tetrafluoride gas can be achieved by some internal recycling of byproducts in the second reactor 5. Typical amounts of recycling byproducts (sulfates) ranges from abouts 0 to about 30% and varies with calcination time in the first reactor 3. Various factors, such as economics and throughput should be considered.

Conditions in the second reactor 5 are selected to avoid excessive dust and low volatile components in the product 7. This condition may be partially achieved by using pre-calcination in the first reactor 3. The product 7 contains quantities of water corresponding to the sulfuric acid concentration used, together with small quantities of sulfuric acid, but is preferably free from dust. In some embodiments, the product 7 may be removed from the feed end of the second reactor 5, either by the parallel-current principle at the end of the second reactor 5, i.e. where the sulfate by-product leaves the reactor, or under the countercurrent principle at the beginning of the second reactor 5, i.e. where the reaction mixture is introduced. In other embodiments, the product 7 may be removed in a separator near the feed zone.

In some embodiments, the sulfuric acid 6 and the fluoride source 1 can be preheated. The sulfuric acid 6 may be conveyed in a countercurrent fashion to the hot silicon tetrafluoride leaving the second reactor 5 to temperatures ranging from about 80 to about 180° C. In some embodiments, furnaces for heating the combustion chambers in the first reactor 3 can be operated using, for example, natural gas or mineral oil as fuel. In some embodiments, the air for combustion can be preheated, e.g., using the residual heat of the waste gases from heating of the first reactor 3.

EXAMPLE 1

Figure 2:
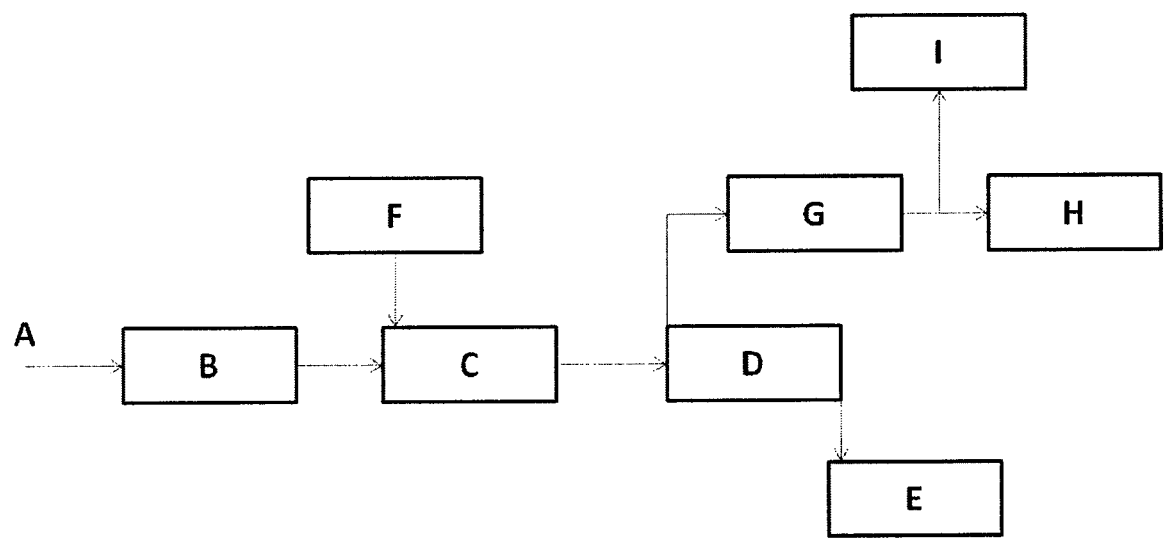
FIG. 2 is a schematic presentation for an embodiment of a bench scale process of a silicon tetrafluoride producing process.

A bench scale system having three half-inch tubular reactors of various length with screw mixers of different design was erected for the following example, see FIG. 2. Reactor tube B was heated externally to about 600° C. and fed raw materials A of fluorspar and sand. Reactor tube C mixes the product from reactor tube B with sulfuric acid F. Silicon tetrafluoride gas is produced in reactor tube D. The temperature of reactor tube D varied between about 150 and about 450° C. By-product collector E has a gas tight seal to block silicon tetrafluoride gas escape. Released product/sulfuric acid is bubbled through sulfuric acid column G and collected by scrubbing with alkali in scrubber H. Scrubbed solution is analyzed to determine the final conversion rate. Gas samples were collected via sampling bag I for long cell Fourier transform infrared spectroscopic (FT-IR) analysis of the gas components. Several bench scale runs, as described above, were made.

The elemental analysis of the scrubbed solution is carried out via ion chromatography and inductively coupled plasma mass spectrometry (ICP-MS) analysis for the impurity distribution in the scrubbed gas. The gas analysis is carried out using the intensity of the peaks for various gases using long cell FT-IR. The following elements were considered: As (2125 cm-1), B (1455, 2520), HCs(4220, 3140), CO (4260, 2140), $CO_2$ (4835, 2345, 3702), H2O(3860, 1700), HCl (2700, 2880), HF(4230, 4060, 4140), NO(1900), SO2(2500, 1360) and the main component $SiF_4$ (1990).

In most of the experiments, silica is maintained at 2% stoichiometric excess with sulfuric acid maintained at 5% stoichiometric excess. In a typical run, 7 grams per minute of silica and fluoride mix is fed to the reactor tube B maintained at temperatures ranging from 200 to 600° C. with a residence time between about 3 to about 20 minutes. In some cases, the feed A is directly fed to reactor tube C to check the conversion and heat transfer efficiency. Sulfuric acid F is added to the reactor tube C. The temperature of the reactor tube C was maintained between about 150 and about 400° C. The sulfuric acid F and feed A mixture residence time in reactor C varied between about 5 and about 30 minutes. Final mass was collected and analyzed for agglomeration, conversion and efficiency. Gases are also collected and analyzed as described above. Table I shows the feed and calcination treatment of the bench scale experiments along with conversion rates and gross observations. Calcination time is typically 20 minutes. Table 2 shows a typical average product gas analysis. Table 3 shows a typical average byproduct gas analysis. Table 4 shows the recycling effect on fluoride conversion.

TABLE 1

| Starting Raw Material | Sulfuric Acid Excess | Conversion | Calcined or UnCalcined | Lump Formation |
|---|---|---|---|---|
| CaF2 | 10% | 99% | Calcined | No |
| CaF2 | 10% | 89% | UnCalcined | Yes |
| CaF2 | 5% | 99% | Calcined | No |
| CaF2 + NaF | 5% | 99% | Calcined | No |
| CaF2 + AlF3 | 5% | 97% | Calcined | No |
| CaF2 + NaF + AlF3 | 5% | 99% | Calcined | No |
| AlF4 | 5% | 98% | Calcined | No |
| NaF + AlF3 | 5% | 99% | Calcined | No |
| NaF + AlF3 | 5% | 87% | Uncalcined | Yes/No |

TABLE 2

Typical Gas Analysis

| | |
|---|---|
| SiF4 | >99% |
| HCl | <50 ppm |
| HF | <25% PPM |
| SO2 | <20 ppm |
| H2O | <20 ppm |

TABLE 3

Secondary waste collection From Calciner

| Feed | |
|---|---|
| CaF2 | <1.5% by weight |
| NaAlF4 | 3-5% by weight |
| NaF | 0% |
| AlF3 | 0% |

TABLE 4

| Calcination time | % Recycled | % Fluoride Conversion |
|---|---|---|
| 20 | 0 | 99 |
| 10 | 0 | 96 |
| 5 | 0 | 90 |
| 10 | 5% | 97 |
| 10 | 10% | 98 |
| 10 | 20% | 99 |
| 10 | 30% | 98.5 |
| 5 | 5% | 94 |
| 5 | 10% | 95 |
| 5 | 20% | 98 |
| 5 | 30% | 98 |

Figure 3:
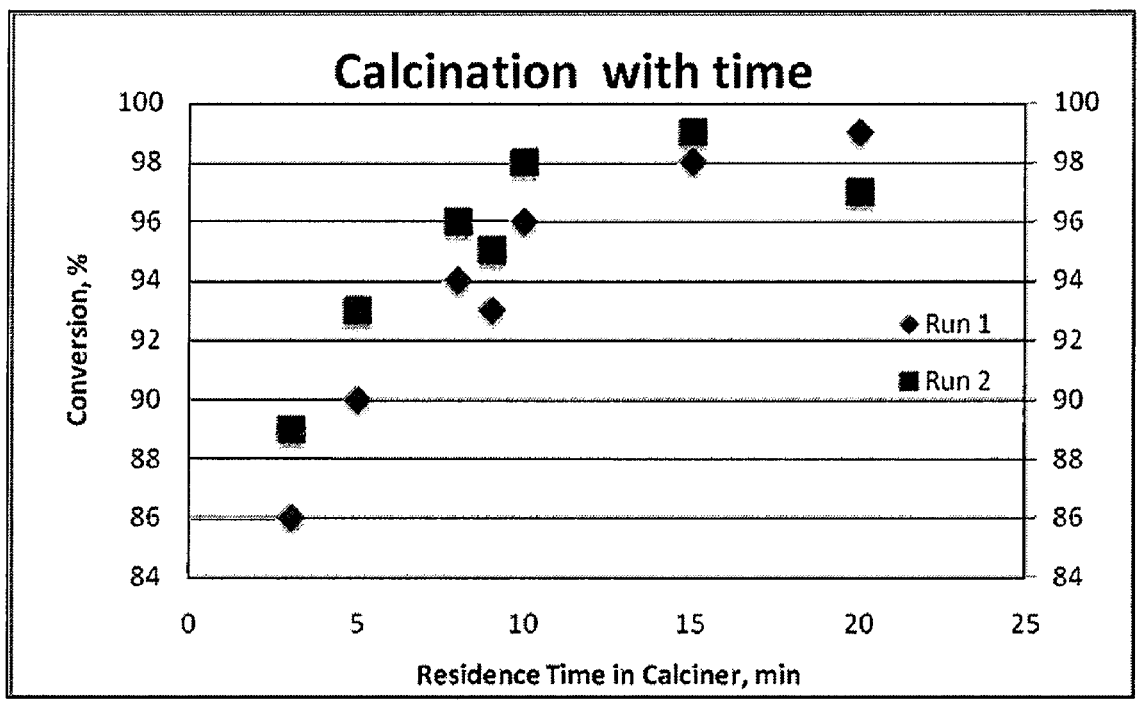
FIG. 3 is a graph of the conversion of fluoride to silicon tetraflouride vs. calcination time.
Figure 4:
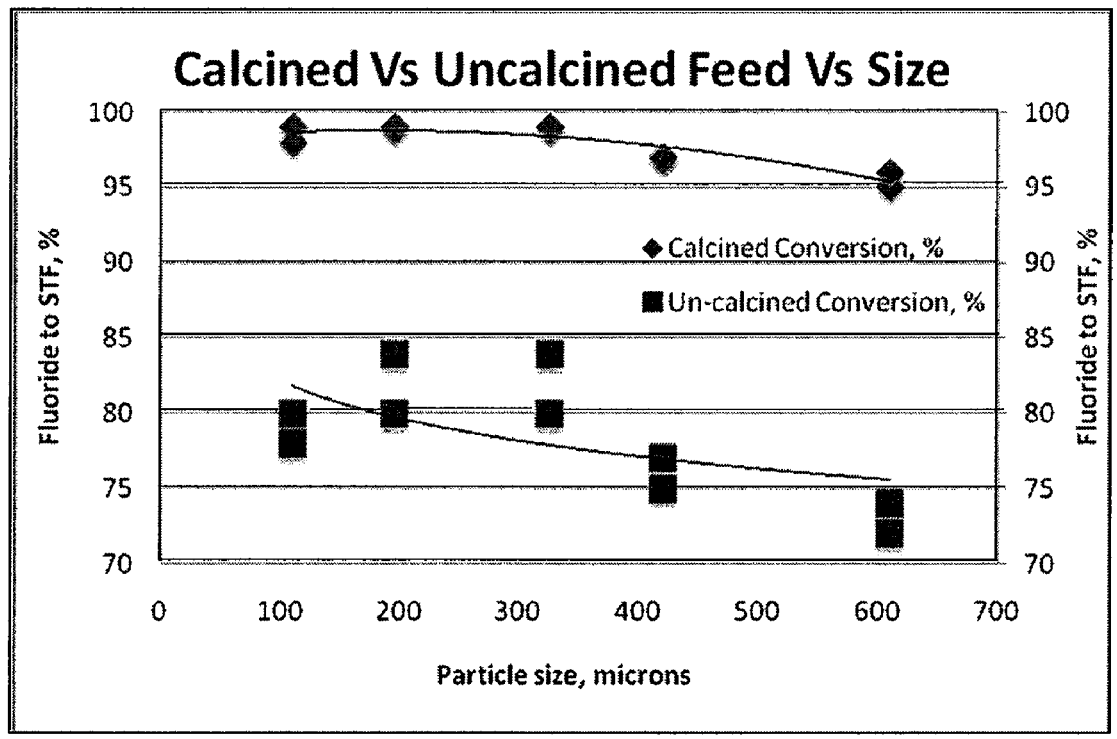
FIG. 4 is a graph of the conversion of fluoride to silicon tetraflouride vs. calcined and un-calcined feed.

FIG. 3 shows the effect of calcination residence time on flouride conversion. The conversion increases with pre-calcination time and reaches the asymptotic value around 20 min in this experiment. This is also related to particle size. Reference graph is generated using around 200 micron average particle size FIG. 4 shows the effect of particle size on calcined and uncalcined feed on fluoride conversion. Uncalcined mass exhibits poor yield in most condition irrespective of particle size. This effect is predicted in all the calcinations time and particle size range.

Figure 5:
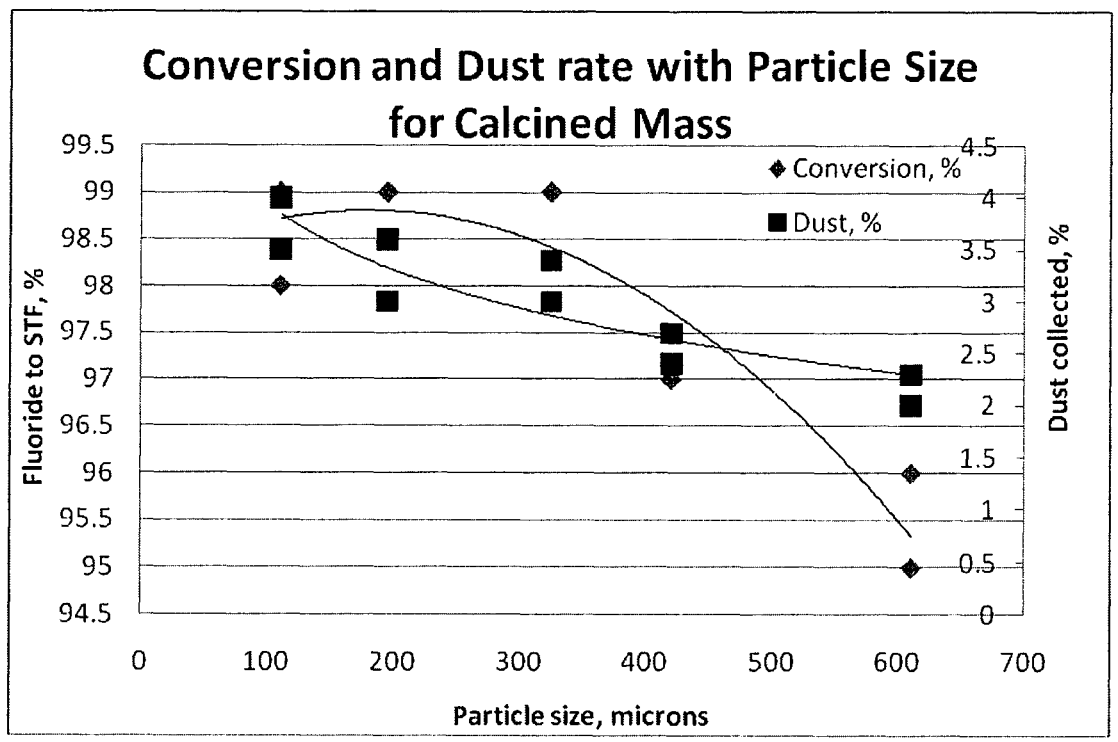
FIG. 5 is a graph of the conversion of fluoride to silicon tetraflouride and dust generated vs. particle feed size for calcined feed.

FIG. 5 shows the effect of particle size of calcined feed on fluoride conversion and dust rate. The dust rate remains constant or decreases and conversion rate also decreases with particle size before passing through an optimum condition.

Figure 6:
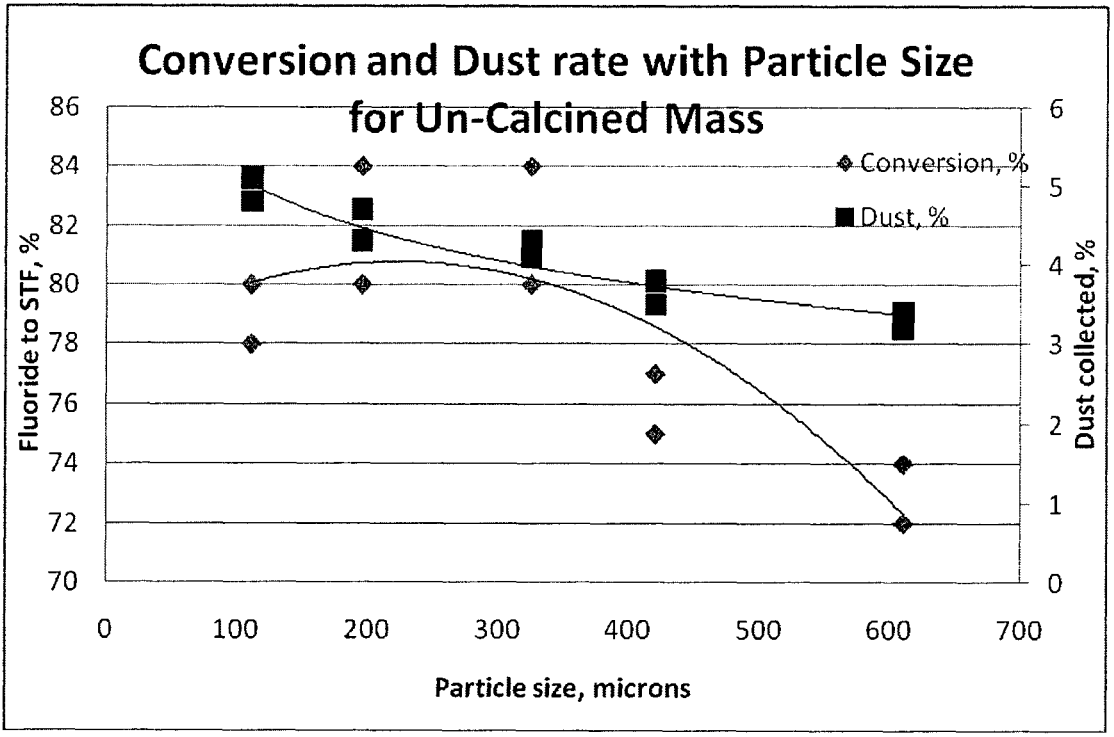
FIG. 6 is a graph of the conversion of fluoride to silicon tetraflouride and dust generated vs. particle feed size for uncalcined feed

FIG. 6 shows the effect of particle size of uncalcined feed on fluoride conversion and dust rate. This graph is similar to graph 5 but for uncalcined mass. The dust rate remains constant or decreases and conversion rate also decreases with particle size before passing through an optimum condition.

EXAMPLE 2

Figure 7:
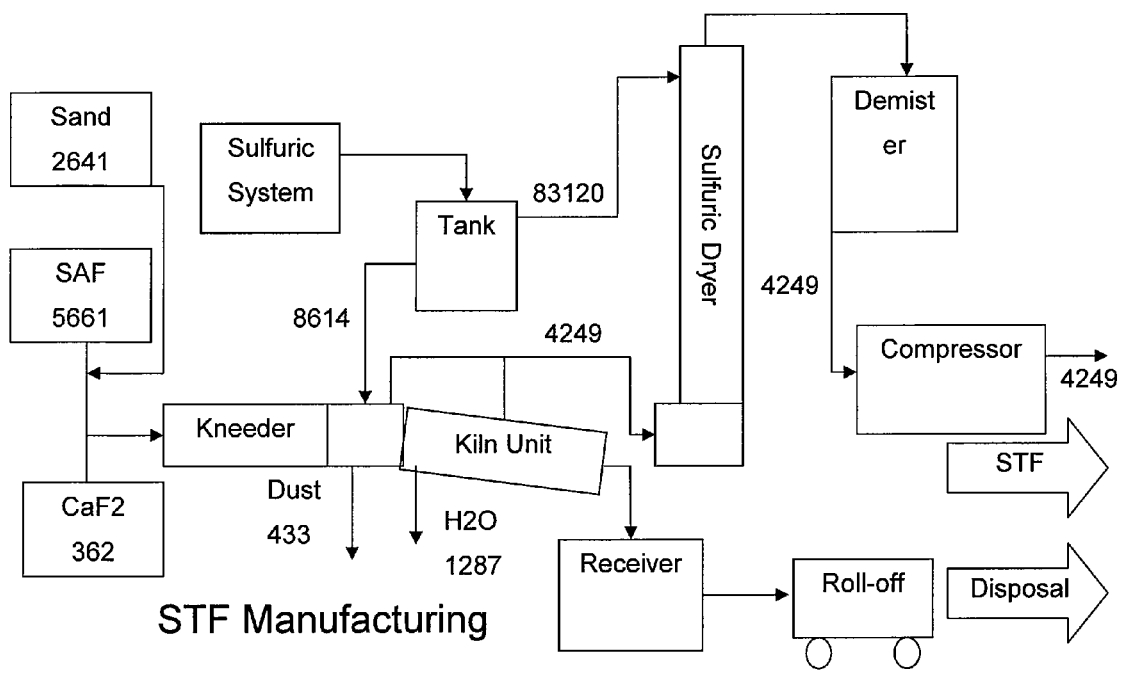
FIG. 7 depicts an industrial operation with a recirculation system and mass balance.

FIG. 7 shows a typical material balance for a silicon tetrafluoride process. Typical conditions of the process include feeding 362 lbs/hr of fluorspar, 2641 lbs/hr of sand and 5661 lbs/hr of sodium and aluminum fluoride as a mix to a kneader and calcining for 20 minutes. The calcined mass and 8614 lbs/hr of sulfuric acid (calculated as 100% strength sulfuric acid) are fed into a rotary tube furnace. The calciner operates at a temperature of about 400° C. and the sulfuric acid has a temperature of about 120° C. The rotary tube furnace has a length of 20 m and a diameter of 2.5 m. The furnace wall temperature in the first zone of the furnace at the first and second combustion chambers was about 350° C. and then dropped linearly to about 220° C. at the last combustion chamber. For this example, there were 3 combustion chambers. The furnace wall temperature was controlled by regulating the quantity of natural gas supplied to the burners in the combustion chambers. The fluorspar content of the reaction product was from 0.3 to 0.9% by weight, and the sulfuric acid content was from 0.3 to 2.0% by weight. The temperature of the hydrogen fluoride gas at the outlet from the furnace was 200° C. and the temperature of the solid reaction product was 198° C.

EXAMPLE 3

Figure 8:
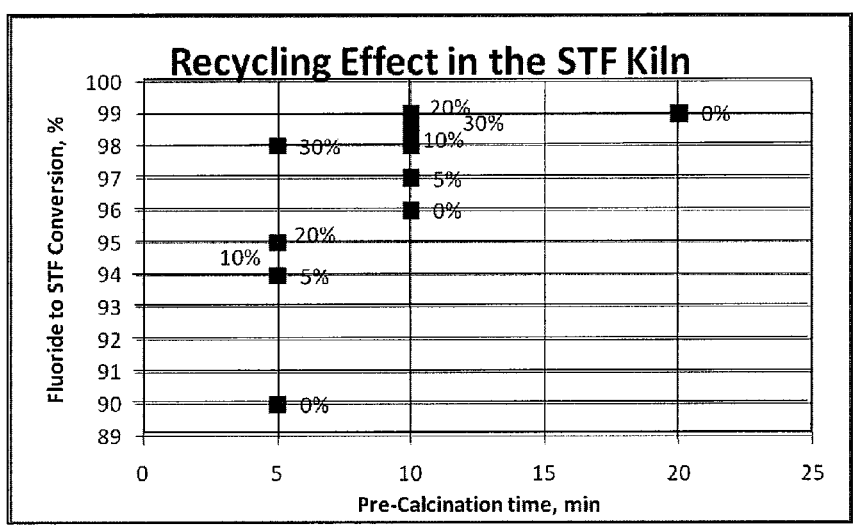
FIG. 8 is a graph of the conversion of fluoride to silicon tetraflouride vs. pre-calcination time and the percentage by-product recirculation.

The same conditions as Example 2 are used with a 10 minute calcination time while maintaining the same conditions. A 10% by-product recycling internally to achive the same fluoride to silicon tetrafluoride conversion. FIG. 8 depicts the fluoride to silicon fluoride gas conversion for various pre-calcination time. The value on the graph is for various percentages mass internal recirculation in the kiln of byproducts. The graph shows that internal by-product recirculation and pre-calcination time go hand in hand. A reduction in the pre-calcination time in the first reactor can achieve the same conversion by recirculation in the second reactor.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

We claim:

1. A process of producing silicon tetrafluoride from metal fluorides, comprising:
    (a) mixing and calcining a feedstock comprising metal fluorides with silicon containing material to produce fluorosilicate complexes;
    (b) reacting the fluorosilicate complexes with sulfuric acid to produce silicon tetrafluoride and metal sulfates; and
    (c) scrubbing the silicon tetrafluoride to remove at least some moisture, dust and other acid gases,
    wherein calcining the feedstock occurs at temperatures ranging from about 300° C. to about 400° C.

2. The process of claim 1, wherein calcining the feedstock occurs at residence times ranging from about 3 to about 25 minutes.

3. The process of claim 1, wherein the average particle size of the feedstock and silicon containing material ranges from about 200 microns to about 600 microns.

4. The process of claim 1, wherein reacting the fluorosilicate complexes with sulfuric acid occurs at temperatures ranging from about 100° C. to about 500° C.

5. The process of claim 1, wherein the amount of sulfuric acid is up to 20% stoichiometric excess.

6. The process of claim 1, wherein the sulfuric acid has a concentration ranging from about 50 to about 100%.

7. The process of claim 1, wherein the sulfuric acid has a concentration ranging from about 98 to about 100%.

8. The process of claim 1, wherein there is a 99% conversion efficiency of the metal fluorides in the feedstock.

9. The process of claim 5, wherein the excess sulfuric acid is recycled.

10. The process of claim 1, wherein the metal fluorides comprise sodium aluminum fluoride.

11. The process of claim 10, wherein the sodium aluminum fluoride is recycled from a silane manufacturing process.

12. The process of claim 1, wherein internal recycling of unreacted feedstock with silicon containing material, sulfuric acid and metal sulfates enhances the yield of silicon tetrafluoride.

* * * * *